(12) United States Patent
Miettunen et al.

(10) Patent No.: US 12,691,602 B2
(45) Date of Patent: Jul. 28, 2026

(54) METHOD AND SYSTEM FOR OPTIMIZING SAWING OF LOGS INTO TIMBER IN A SAWMILL

(71) Applicant: Pinja Solutions Oy, Kempele (FI)

(72) Inventors: Antti Miettunen, Oulu (FI); Juhani Miettunen, Oulu (FI)

(73) Assignee: Pinja Solutions Oy, Kempele (FI)

( * ) Notice: Subject to any disclaimer, the term of this patent is extended or adjusted under 35 U.S.C. 154(b) by 246 days.

(21) Appl. No.: 18/691,911

(22) PCT Filed: Sep. 2, 2022

(86) PCT No.: PCT/FI2022/050580
§ 371 (c)(1),
(2) Date: Mar. 14, 2024

(87) PCT Pub. No.: WO2023/041840
PCT Pub. Date: Mar. 23, 2023

(65) Prior Publication Data
US 2024/0383167 A1 Nov. 21, 2024

(30) Foreign Application Priority Data
Sep. 14, 2021 (FI) ..................................... 20215969

(51) Int. Cl.
*B27B 1/00* (2006.01)
*G05B 15/02* (2006.01)
(Continued)

(52) U.S. Cl.
CPC .............. *B27B 1/007* (2013.01); *B27B 1/005* (2013.01); *G05B 19/182* (2013.01); *G05B 2219/45144* (2013.01)

(58) Field of Classification Search
CPC ........... B27B 1/007; B27B 1/005; B27B 1/00
See application file for complete search history.

(56) References Cited

U.S. PATENT DOCUMENTS 9,505,072 B2 * 11/2016 Barker .................... B27B 1/007
10,857,692 B2 * 12/2020 Strasky ............. G05B 19/4097
(Continued)

FOREIGN PATENT DOCUMENTS

WO WO-2016172763 A1 * 11/2016 ............... B27B 7/00

OTHER PUBLICATIONS

Anonymous, High profitability by Profiling Technology, Linck Holzverarbeitungstechnik Gmbh, May 1, 2014, 24 pages.
(Continued)

*Primary Examiner* — Mohammed S. Alawadi
(74) *Attorney, Agent, or Firm* — Ziegler IP Law Group, LLC.

(57) ABSTRACT

A computer-implemented method for controlling sawing of logs, including obtaining information of a timber lot configured to be produced from logs configured to be sawn, obtaining an optimization objective for a statistical optimization model configured to be used for producing the timber lot, and determining a sawing configuration including at least one sawing pattern for a saw, which sawing configuration is determined based on the optimization objective, which at least one sawing pattern is configured to be used for sawing the logs to timber of the timber lot. The disclosure further relates to a sawing controlling system and a computer program product performing the method.

7 Claims, 4 Drawing Sheets

(51) Int. Cl.
| | |
|---|---|
| *G05B 17/02* | (2006.01) |
| *G05B 19/18* | (2006.01) |
| *G06Q 10/04* | (2023.01) |
| *G06Q 50/04* | (2012.01) |

(56) References Cited

U.S. PATENT DOCUMENTS

| | | |
|---|---|---|
| 2013/0199672 A1 | 8/2013 | Barker |
| 2021/0086391 A1 | 3/2021 | Strasky et al. |

OTHER PUBLICATIONS

European Patent Office, Extended European Search Report, Application No./Patent No. 22869481.6-1218 / 4401936 PCT/FI2022050580, Dated Jun. 10, 2025, 10 Pages.

Rais Andreas et al, The use of the first industrial X-ray CT scanner increases the lumber recovery value: case study on visually strength-graded Douglas-fir timber, Annals of Forest Science, Springer Paris, Paris, vol. 74, No. 2, Apr. 3, 2017, 9 pages.

Finnish Patent and Registration Office, International Preliminary Report on Patentability, Application No. PCT/FI2022/050580, mailed Jan. 12, 2024, 19 pages.

Finnish Patent and Registration Office, International Search Report, Application No. PCT/FI2022/050580, mailed Nov. 29, 2022, 5 pages.

Finnish Patent and Registration Office, Office Action, Application No. 20215969, mailed Apr. 13, 2022, 6 pages.

Finnish Patent and Registration Office, Written Opinion of the International Searching Authority, Application No. PCT/FI2022/050580, Mailed Nov. 29, 2022, 6 pages.

* cited by examiner

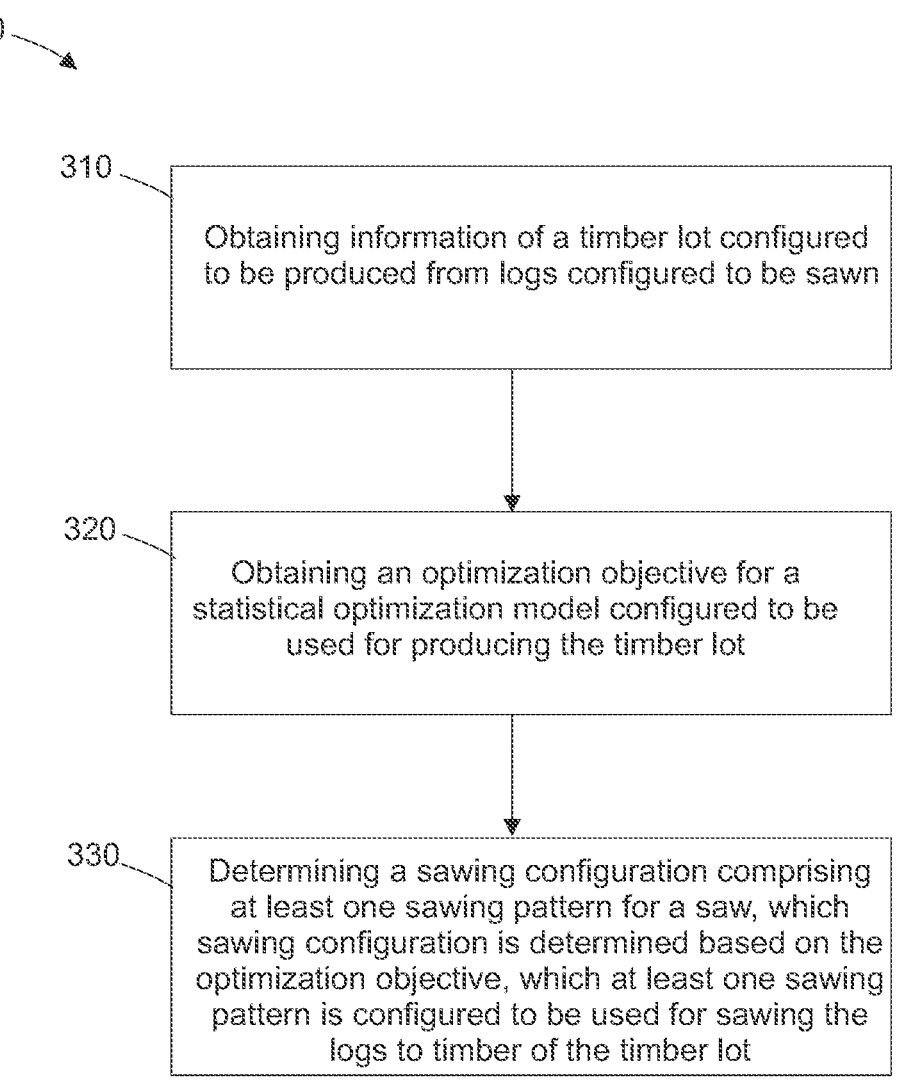

300

310 — Obtaining information of a timber lot configured to be produced from logs configured to be sawn 320 — Obtaining an optimization objective for a statistical optimization model configured to be used for producing the timber lot 330 — Determining a sawing configuration comprising at least one sawing pattern for a saw, which sawing configuration is determined based on the optimization objective, which at least one sawing pattern is configured to be used for sawing the logs to timber of the timber lot

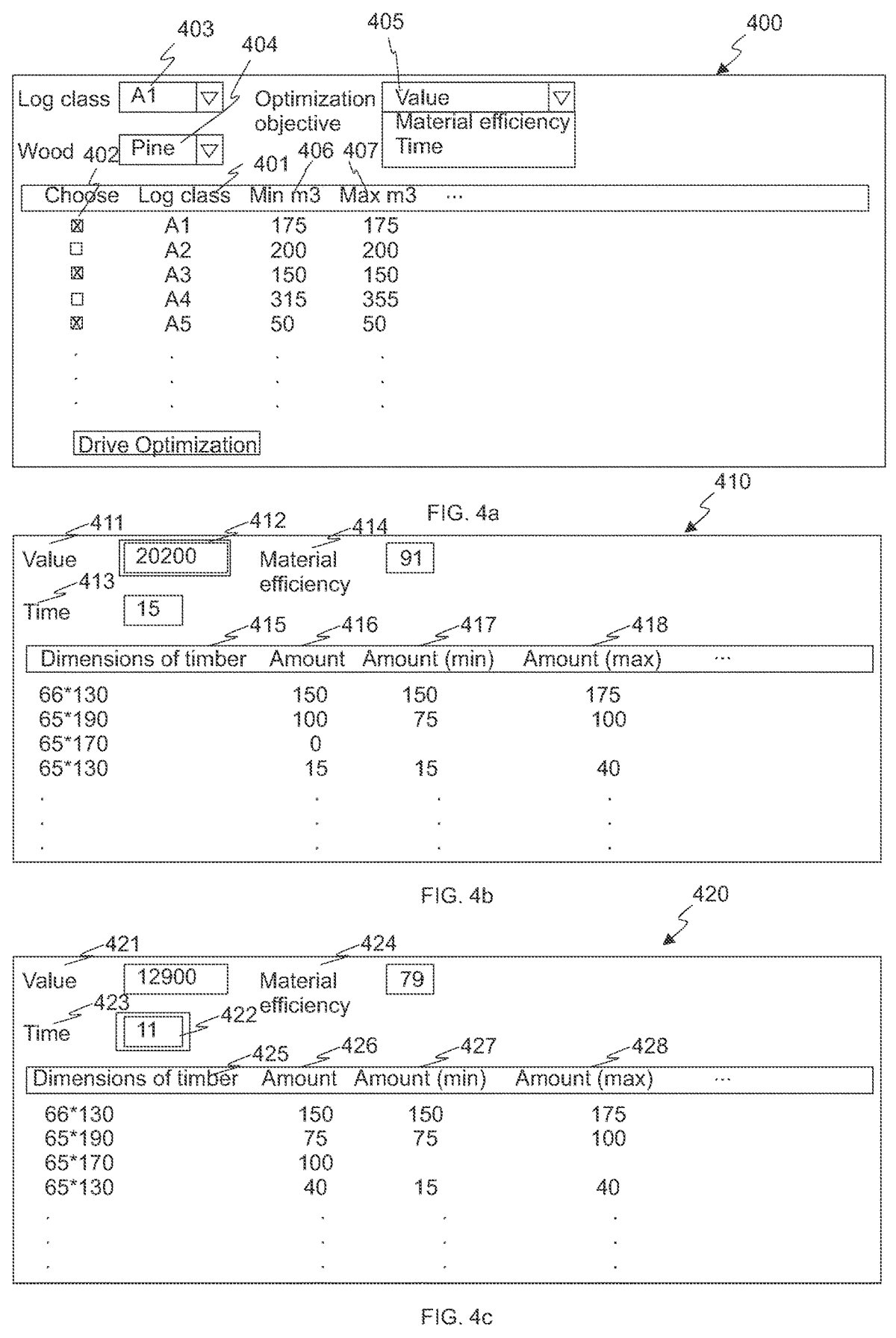

Log class [A1 ▽]  Optimization objective [Value ▽]

Wood 402 [Pine ▽]  401  406  407  Material efficiency / Time

| Choose | Log class | Min m3 | Max m3 | ... |
|--------|-----------|--------|--------|-----|
| ☒ | A1 | 175 | 175 | |
| ☐ | A2 | 200 | 200 | |
| ☒ | A3 | 150 | 150 | |
| ☐ | A4 | 315 | 355 | |
| ☒ | A5 | 50 | 50 | |
| . | . | . | . | |
| . | . | . | . | |
| . | . | . | . | |

[Drive Optimization]

Value [20200]  Material efficiency [91]

413

Time [15]

415  416  417  418

| Dimensions of timber | Amount | Amount (min) | Amount (max) | ... |
|----------------------|--------|--------------|--------------|-----|
| 66*130 | 150 | 150 | 175 | |
| 65*190 | 100 | 75 | 100 | |
| 65*170 | 0 | | | |
| 65*130 | 15 | 15 | 40 | |
| . | . | . | . | |
| . | . | . | . | |
| . | . | . | . | |

Value [12900]  Material efficiency [79]

423  422

Time [11]

425  426  427  428

| Dimensions of timber | Amount | Amount (min) | Amount (max) | ... |
|----------------------|--------|--------------|--------------|-----|
| 66*130 | 150 | 150 | 175 | |
| 65*190 | 75 | 75 | 100 | |
| 65*170 | 100 | | | |
| 65*130 | 40 | 15 | 40 | |
| . | . | . | . | |
| . | . | . | . | |
| . | . | . | . | |

FIG. 4c

METHOD AND SYSTEM FOR OPTIMIZING SAWING OF LOGS INTO TIMBER IN A SAWMILL

TECHNICAL FIELD

The present invention relates to method for controlling sawing of logs.

The invention also relates to a sawing controlling system and a computer program product causing an apparatus to carry out the method of controlling sawing of logs.

BACKGROUND

In sawmill processes, there are logs constantly running through a sawmill cutting logs into lumber. The saw cuts logs lengthwise to make long pieces, and crosswise to length depending on standard or custom sizes (dimensional lumber). Different cutting patterns of a saw produce different sawing yields of timber.

The production of different types of timber products has different requirements, some types may require more processing time, some more raw material and others more production capacity, which affects what kind of timber products are profitable to produce, for example, from different sizes of logs. Further, already made sales and/or log situation i.e. amounts of logs in stock set their demands on the production.

SUMMARY

Now there has been invented an improved method and technical equipment implementing the method. Various aspects of the invention include a method, a sawing controlling system and a computer readable medium comprising a computer program stored therein, which are characterized by what is stated in the independent claims. Various embodiments of the invention are disclosed in the dependent claims.

According to a first aspect of the invention, there is provided computer-implemented method for controlling sawing of logs. The method comprises: obtaining a timber lot order configured to be produced from logs configured to be sawn, obtaining an optimization objective for a statistical optimization model configured to be used for producing the timber lot, and determining a sawing configuration for the timber lot, which sawing configuration comprises sawing pattern for a saw, which sawing configuration is determined based on the optimization objective, logs, and sawing properties of said sawing patterns, and which at least one sawing pattern is configured to be used for sawing the logs to timber according to the timber lot.

According to an embodiment, the method further comprises configuring the saw for sawing the logs based on the sawing configuration. According to an embodiment, the logs configured to be sawn comprises logs from one or more log classes. According to an embodiment, the sawing configuration comprises one or more sawing pattern for logs of one log class or information of a number of logs for which the at least one sawing pattern is configured to be used for sawing. According to an embodiment, sawing properties of the at least one sawing pattern are according to the optimization objective. According to an embodiment, sawing the logs to timber according to the sawing configuration.

According to an embodiment, the method further comprises monitoring at least one of the following sawing properties of a sawing pattern used for sawing: quality of sawn timber, processing time of the sawn timber, material use efficiency of the sawn timber, or processing efficiency of the sawn timber. According to an embodiment, the method further comprises analysing the monitored at least one sawing property of the sawing pattern by comparing the monitored at least one sawing property to the corresponding at least one stored sawing property of the sawing pattern. According to an embodiment, the method further comprises adjusting the at least one stored sawing property of the sawing pattern based on the analysis.

According to a second aspect of the invention, there is provided a sawing controlling system comprising a saw and a process automation system comprising a data processing unit and timber monitoring means, wherein a sawing configuration comprising sawing patterns configured to be used for sawing logs configured to be sawn is determined based on timber of a timber lot order configured to be produced and an optimization objective determined for a statistical optimization model by the data processing unit, logs, and sawing properties of said sawing patterns.

According to an embodiment, the data processing unit is further configured to configure the saw for sawing the logs based on the sawing configuration. According to an embodiment, the saw is further configured to saw the logs to timber according to the optimization objective. According to an embodiment, the timber monitoring means is configured to monitor at least one of the following sawing properties of a sawing pattern used for sawing: quality of sawn timber, processing time of the sawn timber, material use efficiency of the sawn timber, or processing efficiency of the sawn timber. According to an embodiment, the data processing unit is further configured to analyse the monitored at least one sawing property of the sawing pattern, and adjust at least one stored sawing property of the sawing pattern based on the analysis.

According to a third aspect of the invention, there is provided a computer program product, stored on a computer readable medium and executable in a computing device, wherein the computer program product comprises instructions to perform a method according to the first aspect and its embodiments.

BRIEF DESCRIPTION OF THE DRAWINGS

In the following, various embodiments of the invention will be described in more detail with reference to the appended drawings, in which

FIG. 3 shows a sawing pattern controlling method according to an example embodiment, and FIG. 4a shows a user interface for simulating different sawing patterns according to an example embodiment, FIG. 4b shows a user interface window displaying simulation results according to an example embodiment, and FIG. 4c shows a user interface window displaying simulation results according to an example embodiment.

DETAILED DESCRIPTION

Figure 1:
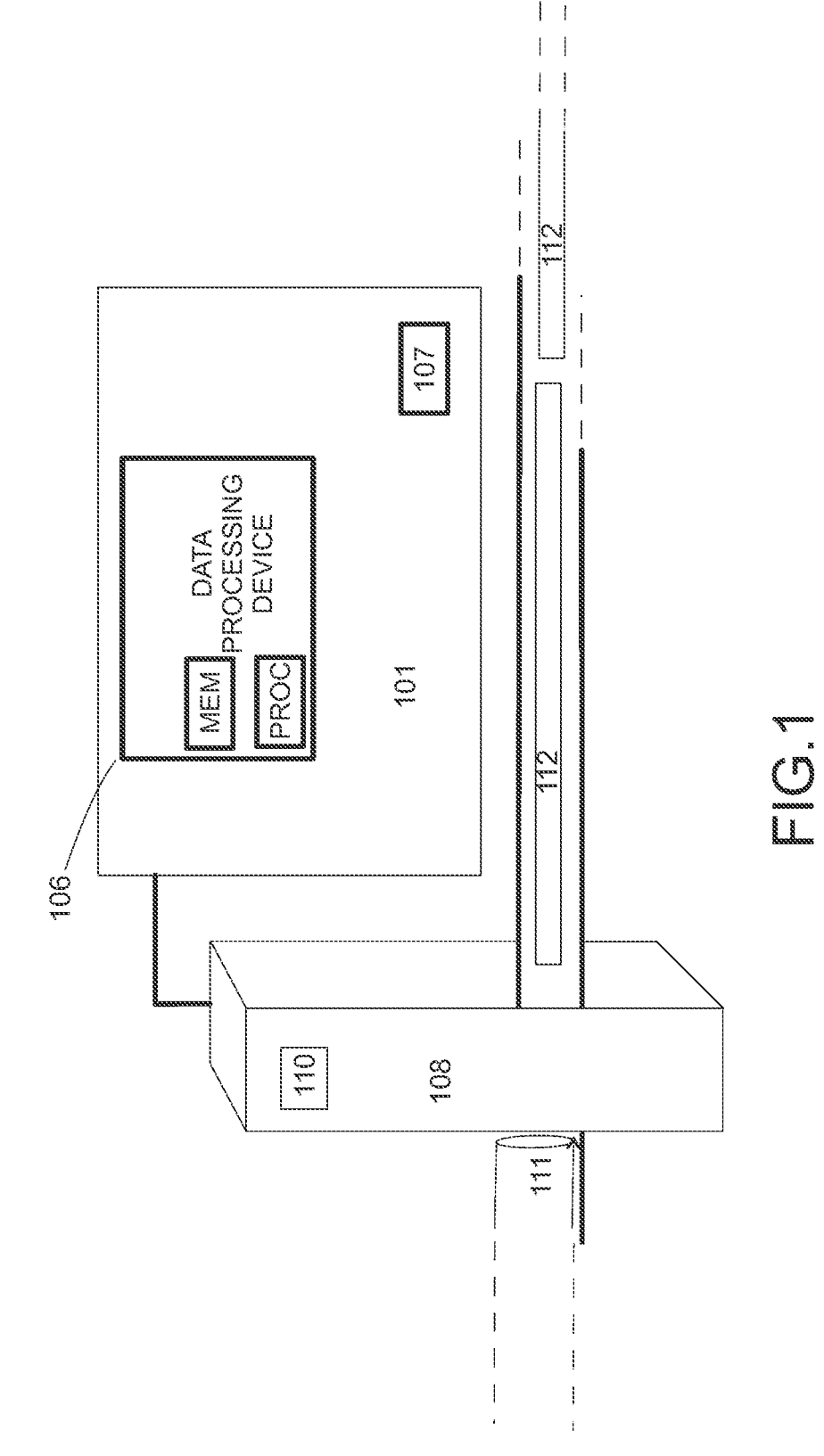
FIG. 1 shows an example embodiment of the invention, in which a sawing controlling system of a saw is disclosed in conjunction with a sawmill.

Log measuring is the first step in the sawing process. Cut trees received from forests are classified by size i.e. length and diameter, and quality with automatic classifying systems into log classes i.e. log categories.

There are several different rules that are used to determine classes for logs. Logs may be sorted either on the way to a sawmill or on arrival at the sawmill. In this context, the term "timber" is a type of wood, lumber, that has been processed into beams, planks or boards, in a process of wood production in a sawmill and may thus refer to anything from a piece of sawn wood through to a processed product.

A saw cuts i.e. saws logs running through a sawmill into timber i.e. to timber products with various different sizes defined by one ore or more sawing patterns determined for the saw. Different sawing patterns i.e. cutting patterns of a log provide different dimensions of sawing yield i.e. different sizes of timber products. There is a number of different sawing patterns to be selected/used depending on, for example, a log class configured to be sawn, quality of a log and/or an end use of the timber.

The production of different sizes of timber products has different requirements, some may require more processing time, some more raw material, for example, more or bigger logs, and some more production capacity, which affects what kind of timber products are profitable to produce from logs of a certain log class, for example, in terms of a gross margin, overall production capacity, production capacity need in different production phases, raw material use and/or a line speed i.e. processing time.

Typically, it is well known by which sawing pattern logs of different log classes should be sawn so that their raw material is used as efficiently as possible i.e. using the best utilization ratio. The utilization ratio means the ratio of the cubic quantity of logs to the cubic quantity of ready sawn timber produced. Therefore, the plan, when an optimization objective is a utilization ratio, may be to saw all log classes with those sawing patterns. This sawing plan may give the absolute best raw material usage i.e. material use efficiency, but in practice, there may be a flaw in that plan because this method does not take into account in more detail what kind of sawn timber is produced, but only the amount of sawn timber, thus it is likely that actual already made sales cannot be delivered i.e. produced timber products do not correspond the sold timber products or produced timber products cannot actually be sold, because there is no market for them, or they have to be sold at a very low price. Alternatively, a saw operator is able to use his/her experience to estimate which timber products should be produced from which logs so that all already made sales can be covered. But this way made production may not be preferable in terms of a gross margin, production capacity, raw material usage and/or a line speed, for example, because production is expensive, or processing may be slow i.e. when an optimization objective is a gross margin, production capacity, raw material usage and/or a line speed.

Thus, the goal of timber production i.e. optimization objective of timber production may be to produce timber that customers want with the least effort, minimum amount of waste i.e. the max raw material use efficiency, the minimum production capacity, the max processing time i.e. the fastest line speed, the max quality or with a combination of two or more of these so that the timber can be efficiently, reliably and/or economically provided for the customers. This requires a system and a method by which the entire supply chain, from a timber lot order to sawing of logs, is optimized in a desired manner i.e. according to optimizing objectives. By this kind of system and method such at least one sawing pattern is selected for sawing logs of one or more log classes so that desired timber is produced in the desired optimized manner.

Logs are classified i.e. sorted into log classes. There may be, for example, up to 100, for example, 20 to 40, for example 30 to 35, or for example around 30, different log classes into which logs are classified. The first aim of log classifying is to group i.e. divide logs into such log classes that the value of the sawing result i.e. timber obtained from them would be as high as possible, taking into account the costs of classifying. Classifying is affected by, among other things, the size of the log warehouse, because each log class needs their own storage space, the number of trays (pockets), the log distribution, the classifying equipment, the classifying accuracy, the sawing method, the production volume and the timber market. The second aim of log classifying, but not any less important, is to group logs into classes so that suitable sawing patterns are possible to be determined for them. The most important classifying criterion is the size of the log and its top diameter. The logs may be classified according to the smallest top diameter, as this determines the size of the heart of the logs. However, for example, log defects, such as looping and bends, are taken into account as a dimensional reduction and such logs are classified into a smaller diameter log class. As a second example, a very conical log is preferable to classify to a smaller diameter log class.

For each log class there may be a number of possible sawing patterns i.e. ways in which a log will be sawn into different kinds of timber products. In other words, by different sawing patterns logs of the same log class can be sawn in different ways so that different timber products are produced, which means that dimensions of a sawing yield are different. Sawing properties are defined for a combination of a sawing pattern and log class i.e. based on sawing properties it is known what kind of timber a sawing pattern produces in a certain log class and how much the sawing pattern requires production capacity in each processing phase, and raw material in that log class and what is a line speed i.e. the processing time in each processing phase, what are the costs, and what is the quality of sawn timber when this sawing pattern is used for logs of that log class. Sawing properties are stored in connection with sawing patterns so that each sawing pattern comprises information about its sawing properties i.e. quality of produced timber, processing costs of the produced timber, processing time of the produced timber, material use efficiency of the produced timber, and processing efficiency of the production timber when this sawing pattern is used for sawing logs of a certain log class. Every sawing pattern has own sawing properties for each log classes. In other words, if a first sawing pattern is used for logs of a first log class are its sawing properties different than sawing properties when the first sawing pattern is used for logs of a second log class.

The sawing properties stored in connection with the sawing patterns may be, for example, the following: rate speed, for example, as seconds/log value, quality, for example, as a percentage value of acceptable timber of all produced timber, material use efficiency, for example, as a percentage value of produced timber volume of used log volume i.e. a utilization ratio, processing costs, for example, as euros, and processing efficiency, for example, as a percentage value of used capacity of available capacity, when this sawing pattern is used in a certain log class.

The present invention enables optimizing of production of timber from a timber lot in a desired selected manner by using desired optimization objective for a statistical optimization model. The statistical optimization model may comprise one or more log classes and one or more sawing patterns and properties of the one or more sawing patterns, production chain information and also other relevant model information, configured to be used for producing the timber lot. In other words, log classes, sawing patterns, and properties of the sawing patterns form an optimization model that is configured to be adjusted according to information received from timber production. By setting/using the desired optimization objective for the statistical optimization model a user may determine his/her optimizing preferences for the sawing process and production of the timber lot i.e. determine how he/she wants to optimize the timber lot production—The optimization objective may be, for example, max quality, min production capacity, max material use efficiency, min costs, or max line speed i.e. min processing time or a some combination of these. The optimization objective may be determined for a data processing unit, for example, by the user or the optimization objective may be predefined or determined by some other way. The idea of selecting optimization objective for a certain timber lot to be produced is that such a sawing pattern or patterns is/are selected for logs of a log class next in line or logs of one or more log classes configured to be sawn by the data processing unit for sawing the logs so that the sawn timber lot is produced according to the optimization objective of the user. As an example, when a user selects that the optimization objective is a processing time i.e. the user optimizes the production so that the production line is as fast as possible for timber lot suitable sawing pattern or patterns producing timber fast are selected for a saw, and the material use efficiency, quality or production capacity efficiency may not, in that case, be the best possible anymore, or it/they may even be poor. Alternatively, if a user selects that optimization objective for a timber lot is high quality, the material use efficiency, processing time or production capacity efficiency may not be the best possible anymore, but sawing is performed with a sawing pattern or patterns providing the best possible timber quality. A timber lot may comprise different sizes of sawn wood products i.e. timber or only same size timber.

The produced timber and production of timber may be monitored by monitoring means, for example, by using a process automation system. The process automation system may be a combination of electronics and hardware and AI software and it grades the sawn timber accurately and consistently. The process automation system may comprise, for example, a data processing unit, and one or more of the following timber monitoring means: at least one camera, for example, regular camera or x-ray camera, processing time monitoring means, process efficiency measuring means, cost approximation means, and/or material use efficiency measuring means. The process automation system may transmit gathered information data to an external data processing unit or cloud service, which analyses the received data, or the process automation system may analyze the data itself. Captured images and measured data of timber and timber production is analyzed and based on the analysis quality, production capacity efficiency, material use efficiency, costs, and processing time in each process phases for each sawing pattern of each log classes may be determined. Suitable sawing pattern or patterns may then be selected for sawing logs configured to be sawn according to an optimization objective determined for a statistical optimization model. The sawing patterns and sawing properties or other information relating to them may be stored in a memory of the process automation system or in a cloud storage etc.

As mentioned above, information gathered by a process automation system may be used for defining sawing properties relating to the sawing pattern used for sawing logs of a certain log class. The stored sawing properties may also be updated based on these monitoring measurements and analysis. Sawing properties comprises information how logs of each log class behaves when sawn with this sawing pattern, i.e. what sawn timber is obtained, how much, at what cost and production speed. It is possible to simulate a sawing pattern before actual sawing of logs i.e. simulate which sawing pattern or patterns should be used for sawing logs of a certain log class and in which ratio i.e. at what percentages the sawing patterns are used if more than one sawing patterns are used so that logs will be sawn according to a statistical optimization model. The selected one or more sawing patterns and their use ratio if more than one sawing pattern is selected can be called as a sawing period plan.

When optimization objective is determined to be a combination of these above mentioned alternatives (max quality, min production capacity, max material use efficiency, or min processing time), the optimization objective may have been defined as percentual parts of these max quality of timber, min production capacity, max material use efficiency, or min processing time. For example, optimization objective may be 50% of max production capacity efficiency and 50% of max material use efficiency, or 70% max production capacity efficiency and 30% of min processing time, or 10% of max production capacity efficiency, 10% max material use efficiency and 80% min processing time, 15% max quality efficiency, 15% min production capacity efficiency, 15% max material use efficiency and 55% min processing time or any other percentage combination of these. Then such a sawing pattern or patterns are selected for producing timber that the conditions of the statistical optimization model and optimization objective are met. For example, when optimization objective with 50% of max production capacity efficiency and 50% of max material use efficiency is selected for a timber lot, then a sawing pattern or patterns by which a such a combination or best possible combination is/are selected by a computer such as a data processing unit.

A saw which is configured to use one or more sawing patterns for sawing may be any existing sawing machine or sawmill line suitable to be configured for sawing according to predetermined sawing pattern or patterns of a sawing period plan.

FIG. 1 shows an example embodiment of the invention, in which a sawing controlling system of a saw 108 is disclosed in conjunction with a sawmill 100. The system comprises the saw 108 and a process automation system 101. The process automation system 101 comprises timber monitoring means 107 and a data processing unit 106. The saw 108 is controllable i.e. its sawing patterns used for sawing can be configured and/or changed, for example, by the data processing unit 106 or by an external data processing unit i.e. the data processing unit may be used for adjusting i.e. configuring setting or settings of saw 108 by defining which sawing pattern should be used and for how many logs. The timber monitoring means 107 may comprise at least one camera, for example, regular camera or x-ray camera, processing time monitoring means, process efficiency measuring means, cost approximation means and/or material use efficiency measuring means.

The timber monitoring means 107 comprise means for transmitting data (not shown) received from at least one camera, processing time monitoring means, process efficiency measuring means, cost approximation means and/or material use efficiency measuring means to a data processing unit. The means for transmitting data may be, for example, a transceiver, or a transmitter arranged to transmit data i.e. detected or measured information or image data wirelessly (not shown) or via a wired connection from the at least one camera, processing time monitoring means, process efficiency measuring means, cost approximation means and/or material use efficiency measuring means to the data processing unit 106 for analysis. Thus, the process automation system 101 is arranged to measure, calculate, detect and/or determine data relating to sawing properties such as processing time information, process efficiency, raw material use, costs, material use efficiency and/or timber quality. It is also possible that the data is transmitted instead or in addition to an external data processing unit or cloud service for analysis. Data may be transmitted for analysis, for example, regularly, at predetermined time points or when requested.

The saw 108 comprises at least means for receiving sawing configuration 110, for example, a transceiver or a receiver, wirelessly or via a wired connection for controlling its sawing pattern. The sawing configuration may comprise a sawing period plan indicate what sawing pattern or patterns should be used and for how many logs 111.

The data processing unit 106 may comprises input means or receiving means for receiving/obtaining information about a timber lot i.e. timber to be produced. The data processing unit 106 further comprises at least one processor, at least one memory including computer program code for one or more program units and sawing patterns with sawing properties relating to, for example, their production quality, max production capacity, max material use efficiency, processing costs and/or min processing time.

The data processing unit 106 comprises means for receiving data from timber monitoring means, for example, a receiver or a transceiver, and means for transmitting sawing configuration 110 to the saw 108 wirelessly or via a wired connection may be, for example, a transmitter or a transceiver. There may be multiple processors e.g. a general purpose processor and a graphics processor and a DSP processor and/or multiple different memories e.g. volatile memory for storing data and programs at run-time and nonvolatile memory such as a hard disk for permanently storing data and programs. The data processing unit 106 may be any computing device that is suitable for analysing measurement data, image data, controlling saw 108 such as a computer.

The data processing unit 106 is in electronic communication with the timber monitoring means 107 and the saw 108 via signal lines. The data processing unit 106 may also include a video controller and an audio controller for generating signals that can be produced for the user with computer accessories. The data processing unit 106 may produce output to the user through output means, for example, on a display. The video controller may be connected to the display. The display may be e.g. a flat panel display or a projector for producing a larger image. The audio controller may be connected to a sound source, such as loudspeakers or earphones.

The data processing unit 106 is configured to analyse received monitoring results i.e. time information, process efficiency information, material use efficiency, costs and image data transmitted by timber monitoring means 107 of the automation process system 101. When analysing received data, the data processing unit 106 may compare sawing properties of used sawing pattern to sawing results, if the difference between the results of at least one property and the corresponding at least one property of the sawing pattern exceeds a threshold value determined for it, the data processing unit 106 may adjust sawing properties of the used sawing pattern based on the analysis. For example, if it determines that one or more stored values of sawing properties of a sawing pattern currently in use, for example, a value of rate speed, quality, material use efficiency or processing efficiency of a sawing pattern is different than the corresponding currently received and analysed value or values, it may control i.e. update or adjust one or more stored values of the sawing properties of the sawing pattern according to the monitoring result or results i.e. to correspond the value of current monitoring results or, for example, to a mean value or values of previous and current sawing properties. It is also possible that it may replace one or more stored values of the sawing properties of the sawing pattern by one or more statistically determined values, which statistically determined values are determined based on one or more stored values of sawing properties and values of currently received monitoring results.

Figure 2A:
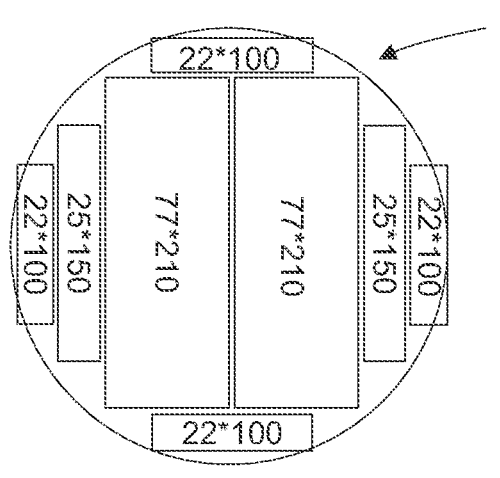
FIG. 2a-d show sawing pattern examples according to an example embodiment.
Figure 2B:
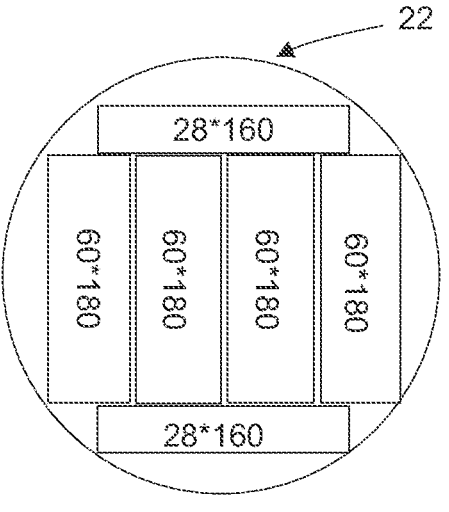

FIGS. 2*a-d* show sawing pattern examples. Sawing properties are stored in connection with the sawing patterns. The sawing properties indicate, for example, value of rate speed (for example, seconds/log), quality (for example, percentage value of acceptable timber of all produced) material use efficiency (for example, percentage value of produced timber volume of used log volume i.e. a utilization ratio) and processing efficiency (for example, percentage value of used capacity of available capacity) of that sawing pattern. FIG. 2*a* shows a sawing pattern 20 and FIG. 2*b* shows another sawing pattern 22. As can be seen, they provide different kind of timber. In this example, the material use efficiency of pattern 20 is 89% and the material use efficiency of pattern 22 is 81%, when a user selects a statistical optimization model with high material use efficiency for a timber lot, and when log class 1 is going to be used, the pattern 20 is selected as the sawing pattern for a saw.

Figure 2C:
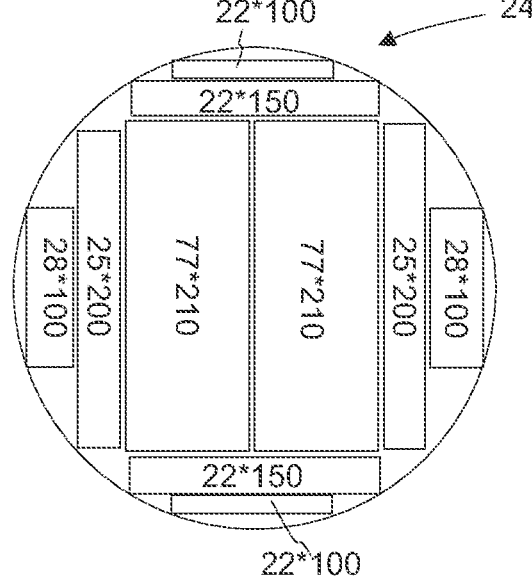
Figure 2D:
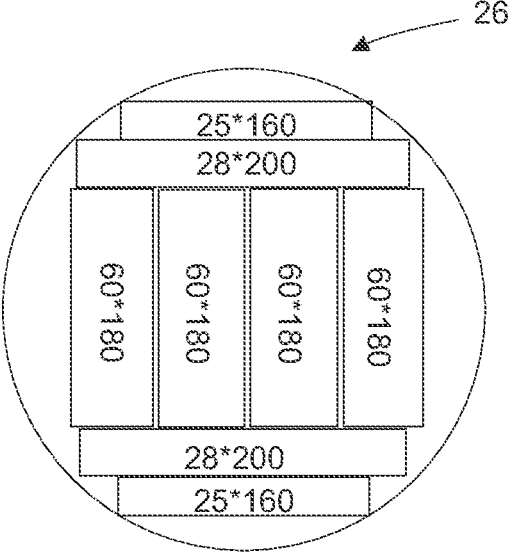

FIG. 2*c* shows a third sawing pattern 24 and FIG. 2*d* shows a fourth sawing pattern 26. In connection with the sawing patterns 24, 26 are also stored sawing properties indicating rate speed value, timber quality, material use efficiency or processing efficiency of these patterns 24, 26. In this example, the rate speed value of pattern 24 is 115 s/log and the rate speed value of pattern 26 is 105 s/log and, when a user selects an statistical optimization model with high line speed i.e. min processing time for a timber lot and log class 7 is going to be used, the pattern 26 is selected as the sawing pattern for a saw.

As already said above, the number of different log classes may be high, it may be several dozens, as well as there may be up to several dozens of different sawing patterns even for each class.

FIG. 3 shows a computer-implemented method 300 for controlling sawing of logs according to an example embodiment. In step 310, information of a timber lot configured to be produced from logs configured to be sawn is obtained. The logs configured to be sawn may comprise logs from one or more log classes. In step 320, an optimization objective for a statistical optimization model configured to be used for producing the timber lot is obtained. In step 330, a sawing configuration comprising at least one sawing pattern for a saw is determined. The sawing configuration is determined based on the optimization objective. The at least one sawing pattern is configured to be used for sawing the logs to timber of the timber lot. The sawing configuration may comprise one or more sawing pattern for logs of one log class, one or more sawing pattern for logs of more than one log class, or information of a number of logs for which the at least one sawing pattern is configured to be used for sawing. The sawing properties of the determined at least one sawing pattern are such that they correspond the obtained optimization objective.

The method may further comprise configuring the saw for sawing the logs based on the sawing configuration, sawing the logs to timber according to the sawing configuration, and/or monitoring at least one of the following sawing properties of a sawing pattern used for sawing: quality of sawn timber, processing time of the sawn timber, material use efficiency of the sawn timber, or processing efficiency of the sawn timber. The method may even further comprise analysing the monitored at least one sawing property of the sawing pattern by comparing the monitored at least one sawing property to the corresponding at least one stored sawing property of the sawing pattern and adjusting the at least one stored sawing property of the sawing pattern based on the analysis.

FIG. 4a shows a first user interface window 400 for simulating different sawing patterns according to an example embodiment. In the user interface window 400 there are shown few features of possible features wherefrom a user can select for the simulation. Selectable features are in this embodiment log classes, amounts of logs of log classes, tree type, and optimizing objective, but it may be any other feature described above in the description. In this example, log classes 401 can be selected by tapping a box 402 in front of desired log class 401 or by selecting one or more log classes from a pull-down menu 403. Wood type is selectable from a pull-down menu 404 and optimizing objective form a pull-down menu 405. Amounts of log classes can be filled to their min and max lines 406, 407. All selectable or fillable features are thus not shown in this figure even if they may effect to the simulation results. The optimizing can be driven using a Drive Optimization button 409.

FIG. 4b shows a second user interface window 410 displaying simulation results according to an example embodiment. The Value 411 is used as an optimization objective in the simulation. Used optimization objective is indicated by double rectangles around the simulation result 412 of the Value. However, it is possible to indicate it by any other means/way, for example, by color, light, underlining etc. The simulation result values of Time 413, and Material Efficiency 414 are also shown in the window 410. Dimensions of Timber sizes simulated to be produced when the optimization objective is the Value are indicated in a Dimensions of Timber bar 415 and amounts of timber of different sizes simulated to be produced are indicated in an Amount bar 416. Amount (min) bar 417 and Amount (max) bars 418 indicate the minimum and maximum amounts of the timber product in question required to be produced as an end result, correspondingly. If the minimum amount is not defined, the minimum amount is zero and/or if the maximum amount is not defined, the maximum amount is unlimited.

FIG. 4c shows a second user interface window 420 displaying simulation results according to an example embodiment. The Time 411 is used as an optimization objective in this simulation i.e. the simulation was optimized to produce the timber as fast as possible. Used optimization objective is indicated by double rectangles around its simulation result 412. But it is possible to indicate it by any other means, for example, by color, light, underlining etc. Dimensions of Timber sizes simulated to be produced when the optimization objective is the Time are indicated in a Dimensions of Timber bar 425, and amounts of timber of different sizes simulated to be produced are indicated in an Amount bar 426. An Amount (min) bar 427 and Amount (max) bars

428 indicate again the minimum and maximum amounts of the timber product, in question, required to be produced.

As can be seen the result value of Time 423 is lower i.e. faster, but both the Value 421 and Material Efficiency 424 are worse i.e. their values are lower compared to the simulation results shown in FIG. 4b, which simulation was optimized to produce the timber as cost effectively as possible, with the best value. Amounts of timber of different sizes shown in the Amount bar 426 and going to be produced when the optimization objective is the Time are again different compared to amounts of different timber products shown in the Amount bar 416 of FIG. 4b due to a different sawing configuration and its one or more sawing patterns selected for the simulation based on different optimization objective. It is obvious that different sawing patterns provides different sized timber.

The various embodiments of the invention can be implemented with the help of computer program code that resides in a memory and causes an apparatus to carry out the invention. For example, the apparatus that is a computing device, for example, a data processing unit may comprise circuitry and electronics for analysing, receiving and transmitting data, a computer program code in a memory, and a processor which, when running the computer program code, causes the apparatus to carry out the features of an embodiment. The processor, when running the computer program code, may carry out the steps of the method indicated in context with FIG. 3.

Monitoring sensors of an automation process system comprise at least circuitry and electronics for measuring and/or detecting processing properties and transmitting the data to a data processing unit. Camera sensors comprise circuitry and electronics for capturing images of timber products and transmitting the captured image data to the data processing unit. A controllable saw according to the invention comprise circuitry and electronics for receiving control messages from the data processing unit defining a sawing pattern or patterns to be used and for how many logs.

It is obvious that the present invention is not limited solely to the above-presented embodiments, but it can be modified within the scope of the appended claims.

The invention claimed is:

1. A computer-implemented method for controlling sawing of logs, comprising:
  obtaining a timber lot order configured to be produced from logs configured to be sawn;
  obtaining an optimization objective for a statistical optimization model configured to be used for producing the timber lot, wherein the optimization objective is a combination of two or more of the following: a max quality, a min production capacity, a max material use efficiency, a min cost, or a max line speed so that the timber lot is produced as desired;
  determining a sawing configuration for the timber lot, wherein the sawing configuration comprises sawing patterns for a saw, and is determined based on at least the optimization objective and sawing properties of said sawing patterns, and wherein said sawing patterns are configured to be used for sawing the logs to timber according to the timber lot order and the optimization objective;
  sawing the logs to timber according to the sawing configuration;
  monitoring at least one of the following sawing properties of a sawing pattern for sawing:
  a quality of sawn timber,
  a processing time of the sawn timber, a material use efficiency of the sawn timber, or a processing efficiency of the sawn timber; and analysing the monitored at least one sawing property of the sawing pattern by comparing the monitored at least one sawing property to the corresponding at least one stored sawing property of the sawing pattern.

2. The method according to claim 1, wherein the method further comprises configuring the saw for sawing the logs based on the sawing configuration.

3. The method according to claim 1, wherein the logs configured to be sawn comprises logs from one or more log classes.

4. The method according to claim 1, wherein the sawing configuration comprises one or more sawing pattern for logs of one log class or information of a number of logs for which the at least one sawing pattern is configured to be used for sawing.

5. The method according to claim 1, wherein sawing properties of the at least one sawing pattern are according to the at least two optimization objectives.

6. The method according to claim 1, wherein the method further comprises adjusting the at least one stored sawing property of the sawing pattern based on the analysis.

7. A computer program product, stored on a non-transitory computer readable medium and executable in a computing device, wherein the computer program product comprises instructions to perform a method comprising:

obtaining a timber lot order configured to be produced from logs configured to be sawn;

obtaining an optimization objective for a statistical optimization model configured to be used for producing the timber lot, wherein the optimization objective is a combination of two or more of the following: a max quality, a min production capacity, a max material use efficiency, a min cost, or a max line speed so that the timber lot is produced as desired;

determining a sawing configuration for the timber lot, wherein the sawing configuration comprises sawing patterns for a saw, and is determined based on at least the optimization objective and sawing properties of said sawing patterns, and wherein said sawing patterns are configured to be used for sawing the logs to timber according to the timber lot order and the optimization objective;

sawing the logs to timber according to the sawing configuration;

monitoring at least one of the following sawing properties of a sawing pattern for sawing:

a quality of sawn timber, a processing time of the sawn timber, a material use efficiency of the sawn timber, or p2 a processing efficiency of the sawn timber; and analysing the monitored at least one sawing property of the sawing pattern by comparing the monitored at least one sawing property to the corresponding at least one stored sawing property of the sawing pattern.

\* \* \* \* \*